Jan. 3, 1956  R. G. LE TOURNEAU  2,729,310
ELECTROMAGNETIC BRAKE
Filed Oct. 17, 1952  2 Sheets-Sheet 1

INVENTOR.
ROBERT G. LE TOURNEAU
BY
*Lyon & Lyon*
ATTORNEYS

Jan. 3, 1956     R. G. LE TOURNEAU     2,729,310
ELECTROMAGNETIC BRAKE

Filed Oct. 17, 1952     2 Sheets-Sheet 2

INVENTOR.
ROBERT G. LE TOURNEAU
BY
*Lyon & Lyon*
ATTORNEYS

United States Patent Office 2,729,310
Patented Jan. 3, 1956

2,729,310

ELECTROMAGNETIC BRAKE

Robert G. Le Tourneau, Longview, Tex.

Application October 17, 1952, Serial No. 315,329

4 Claims. (Cl. 188—171)

This invention relates to spring applied, electromagnetically released brakes for motors and more particularly to the elimination of drag between the friction elements of the brakes.

In brakes of this type, rotating and nonrotating friction elements or plates are mounted for frictional engagement under spring pressure to apply the brakes. Upon energization of electromagnetic means the plates slide axially and in theory are freed from engagement one with the other to permit rotation of the motor. However, in practice there is frequently present a detrimental brake drag caused by the failure of the plates to be completely free from engagement one with the other. My invention is concerned with the provision of an improved brake having novel means for overcoming the problem outlined above.

It is therefore a primary object of my invention to provide a spring applied electromagnetically released brake in which drag between the rotating and stationary friction elements is eliminated.

Another object of my invention is to provide such a brake having a stator member and a rotor member each carrying axially slidable friction elements, a pressure plate, and connecting means of nonmagnetic material for slidably mounting the pressure plate and the friction elements on one of said members.

Another object is to provide a brake in which drag between the rotating and stationary friction plates is eliminated and in which the end bell serves the dual function of carrying magnetic lines of force as well as holding the shaft supporting bearing in place.

Another object is to provide a brake in which drag between the rotating and stationary friction plates is eliminated and in which the coil is placed in the end bell in substantially the same plane with the shaft supporting bearing, thereby shortening the overall length of the brake.

These and other objects will become apparent upon perusal of the specification and claims.

Figure 1:
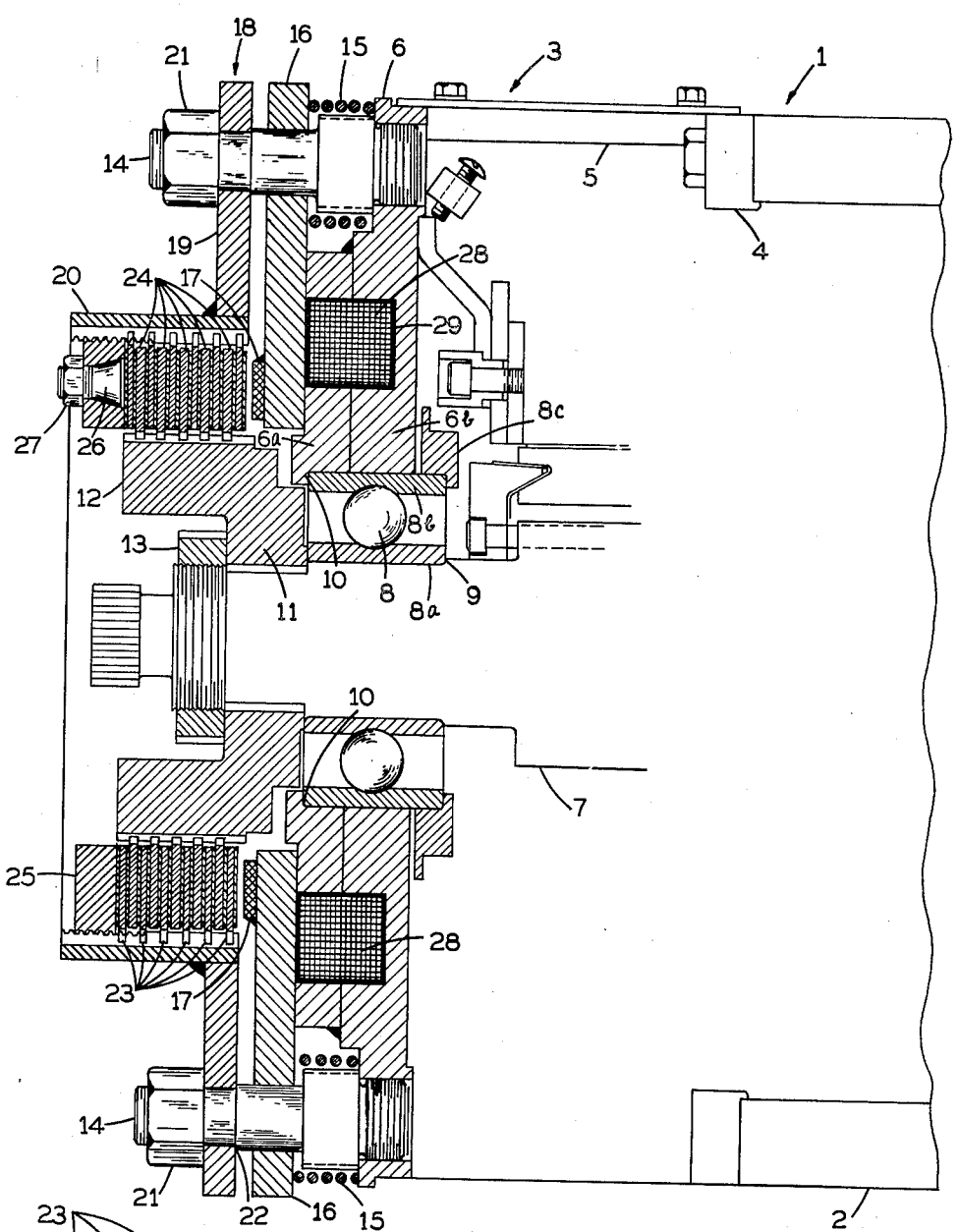
Fig. 1 is a fragmentary side view of a motor embodying my invention partly in section, showing the brake in its released position.
Figure 6:
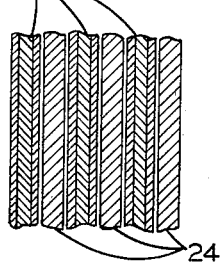
Fig. 6 is an enlarged fragmentary view of part of the friction plates of Fig. 1.
Figures 2, 5:
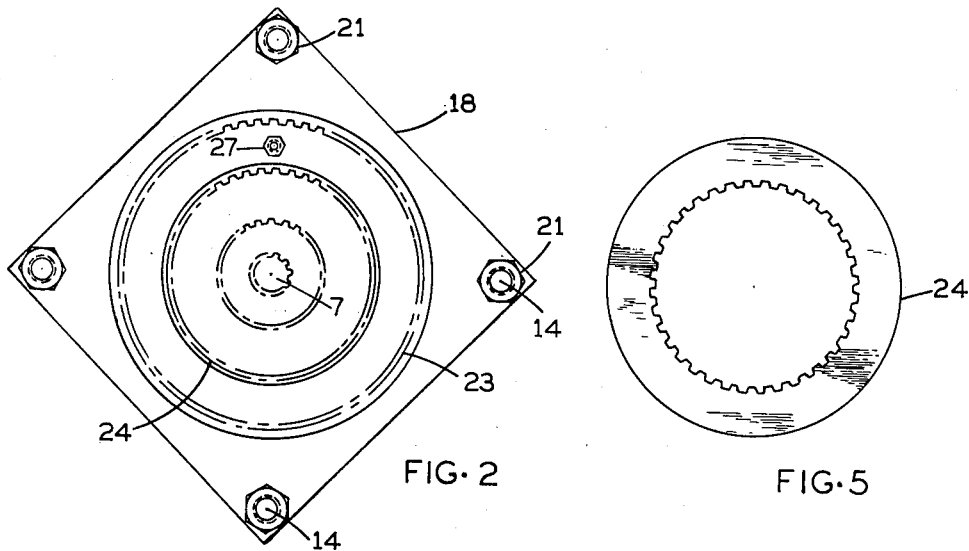
Fig. 2 is an end view of Fig. 1 reduced in size.
Fig. 5 is a plan view of the rotating plates of Fig. 1 reduced in size.
Figures 3, 4:
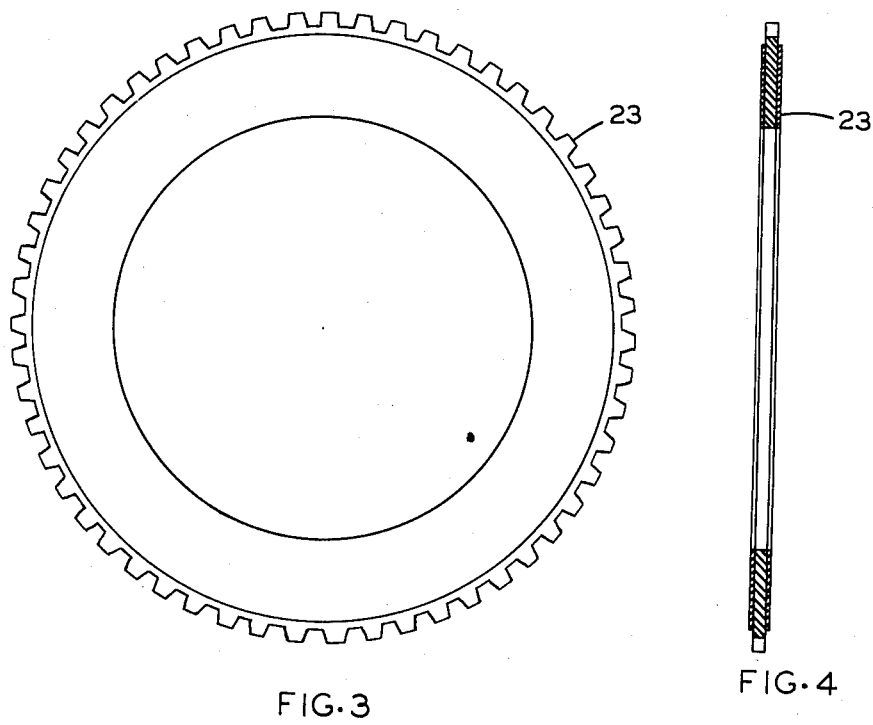
Fig. 3 is a plan view of the stationary brake friction plates of Fig. 1.
Fig. 4 is a side view of Fig. 3.

Referring more particularly to the drawings, motor 1 comprises a casing 2 having a stator member in the form of an end bell structure 3 bolted thereto. This stator member is a single welded structure comprising an annular bolt ring 4, spacer bars 5 and an end portion or end bell 6. The end bell 6 is made up of two plates 6a and 6b welded together to form an integral end bell, as shown in Fig. 1. Surrounding the motor shaft 7 is a shaft supporting bearings means having ball bearings 8, an inner race 8a engaging shoulder 9 of the shaft and having an outer race 8b engaging a shoulder 10 of the end bell plate 6a. Bearing retainer 8c is secured to the end bell 6 by bolts (not shown) and cooperates with shoulder 10 to hold the outer race 8b in place. The motor shaft 7 has splined thereto an annular brake hub 11 having a flange 12, and the shaft, hub and flange unit may be termed a rotor member. A nut 13 bears against hub 11 to hold it firm against the inner bearing race 8a and to keep the bearing race firm against the shoulder 9. The stator member, the bearing races, the ball bearings and the rotor member are all of highly permeable material, such as steel or the like, capable of carrying highly concentrated flux.

Connecting means comprising four nonmagnetic studs 14, which may be of a "stainless steel," are threaded to engage threads in the end bell 6. Brake engaging springs 15 surround the studs and bear against the end bell 6 and a magnetic pressure plate 16, which pressure plate is slidably mounted on the studs 14. Pressure plate 16 has fixed thereon friction plate engaging nonmagnetic pads 17, the action of which will be later described. Also mounted on studs 14 is a support means in the form of a brake drum 18 comprising a plate 19 and a cylinder 20. Nuts 21 hold the brake drum 18 in a fixed position bearing against shoulders 22 of studs 14.

Stationary brake friction elements or plates 23 are mounted in the support means by being splined within the cylinder 20 of the brake drum. These stationary elements are made of paramagnetic material, preferably steel, and have friction lining material on each side thereof. Rotating brake friction elements of plates 24 are splined on flange 12 of hub 11 and are assembled in alternating sequence with the stationary brake elements as shown in Fig. 1. The friction plates are all axially slidable and are made of paramagnetic material, preferably steel. The brake friction elements are adjustably held in place by a magnetic backing member in the form of a threaded lock ring 25 having a cone-shaped plug 26 and nut 27, details of which may be more clearly seen in my copending application Serial No. 268,969, filed January 30, 1952.

Annular brake releasing coil 28 is mounted in a recess 29 in end bell 6 and is positioned in substantially the same plane as the bearing means 8, 8a, and 8b. The brake of my invention is spring applied by the action of springs 15 against the pressure plate 16 whose pads 17 force elements 23 and 24 into frictional engagement to lock the rotor member. The brake is electromagnetically released by the energization of coil 28 which attracts pressure plate 16 to free the brake elements from frictional engagement.

It will be noted that the coil 28 carried by the end portion or end bell 6 is mounted in substantially the same plane as, and radially outwardly of, the bearing means. Several advantages are had by the particular structure of the end bell 6 of the stator member. The metal of the end bell serves the dual function of holding the bearing in place and of carrying the magnetic lines of force set up by the coil 28 as will hereinafter be described. Another advantage is that the overall length of the brake is shortened by putting the coil in substantially the same plane with the bearing.

It has been found that the provision of studs 14 of nonmagnetic or diamagnetic material causes such distribution of magnetic flux throughout the parts that the brake plates 23 and 24 are actually caused to move apart and thus substantially eliminate frictional drag. It was found that with studs 14 made of paramagnetic material energization of coil 28, while effecting withdrawal of pressure plate 16, induced sufficient magnetic attraction between plates 23 and 24 to cause objectionable frictional drag.

With studs 14 of paramagnetic material, a flux path of relatively low reluctance is established through the stack of friction plates and high flux densities exist therein, causing the objectionable friction drag that was found to exist. With studs of nonmagnetic material the flux density in the friction plates is greatly reduced and the "lines of force" seek the shortest path back to pressure plate 16 across the air gap between plates 16 and 19 and seek to shorten themselves, thus moving the friction plates toward the right as seen in Fig. 1. The force tending to so move the friction plates is clearly greatest in that plate nearest the coil and diminishes toward the outer end of the brake. Those lines of force through the outermost plates probably find the path of least reluctance through the lock ring 25 since it has been observed that the outer plate actually bears against the lock ring when coil 28 is energized.

It is to be noted that hub 11 extends into close proximity to end bell plate 6a, thereby establishing a flux path of sufficiently low reluctance to create a magnetic field in the friction plates of sufficient strength to separate the plates in the manner described.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. In a brake structure, a stator member, a rotor member journalled on said stator member, axially slidable friction elements carried by said stator member, axially slidable friction elements carried by said rotor member and frictionally engageable with said elements on said stator member, an axially slidable pressure plate arranged to press said friction elements together, an electromagnetic coil on one of said members arranged to withdraw said pressure plate from said friction elements, spring means arranged to urge said pressure plate toward said friction elements, said stator member, rotor member, pressure plate and friction elements being formed substantially entirely of paramagnetic material, support means of magnetic material slidably supporting the friction elements, and nonmagnetic studs mounting the support means and slidably mounting said pressure plate on one of said members.

2. In a brake structure, a stator of magnetic material, a rotor of magnetic material journalled in said stator, an electromagnetic coil on said stator, a longitudinally splined portion of said rotor slidably supporting a plurality of magnetic friction plates, support means slidably mounting a plurality of stator friction plates of magnetic material alternately interposed between the friction plates on said rotor, nonmagnetic studs holding said support means in fixed axial relation to said coil, a magnetic pressure plate axially slidable on said studs between said coil and said friction plates, and spring means urging said pressure plate toward said friction plates.

3. A brake structure as defined in claim 2 wherein said support means is of magnetic material, and a backing member of magnetic material fixedly carried by said support means on the side of said friction plates opposite said pressure plate.

4. In a brake structure, a stator having an end portion, bearing means carried by said stator adjacent said end portion, a rotor journalled in said bearing means and projecting beyond said end portion, cooperating sets of stator and rotor friction elements carried by said stator and the projecting part of said rotor, respectively, an axially movable magnetic pressure plate between said friction elements and said end portion, and an electromagnetic coil carried by said end portion substantially in the same plane as and radially outwardly of said bearing means, said end portion serving the dual function of carrying magnetic lines of force and holding the bearing in place.

References Cited in the file of this patent

UNITED STATES PATENTS

| | | |
|---|---|---|
| 1,925,956 | Easter | Sept. 5, 1933 |
| 2,368,317 | Meyer et al. | Jan. 30, 1945 |
| 2,512,565 | Hallander | June 20, 1950 |
| 2,522,622 | Laurant | Sept. 19, 1950 |